United States Patent
Laiho et al.

(10) Patent No.: US 6,754,830 B1
(45) Date of Patent: Jun. 22, 2004

(54) METHOD AND COUPLING ARRANGEMENT FOR PREVENTING UNAUTHORIZED ACCESS TO A MICROPROCESSOR

(75) Inventors: Kimmo Laiho, Turku (FI); Ismo Kaunisto, Turku (FI)

(73) Assignee: Nokia Multimedia Terminals Oy (FI)

( * ) Notice: Subject to any disclaimer, the term of this patent is extended or adjusted under 35 U.S.C. 154(b) by 0 days.

(21) Appl. No.: 09/513,594

(22) Filed: Feb. 25, 2000

(30) Foreign Application Priority Data

Feb. 26, 1999 (FI) .................................................. 990414

(51) Int. Cl.[7] ................................................. G06F 11/00
(52) U.S. Cl. ........................ 713/200; 713/165; 380/25; 340/825.31; 340/571; 340/5.74
(58) Field of Search ................... 713/200, 201, 713/165, 187; 380/25; 340/825.31, 571, 5.74

(56) References Cited

U.S. PATENT DOCUMENTS

| | | | |
|---|---|---|---|
| 4,494,114 A | | 1/1985 | Kaish .................... 340/825.31 |
| 4,791,565 A | * | 12/1988 | Dunham et al. ............. 713/200 |
| 4,901,341 A | * | 2/1990 | Carter et al. ............. 379/88.24 |
| 5,289,540 A | * | 2/1994 | Jones ......................... 713/165 |
| 5,355,414 A | | 10/1994 | Hale et al. ..................... 380/25 |
| 5,406,261 A | | 4/1995 | Glenn ......................... 340/571 |
| 5,724,027 A | * | 3/1998 | Shipman et al. ............. 713/201 |
| 6,091,946 A | * | 7/2000 | Ahvenainen ................ 455/411 |
| 6,437,308 B1 | * | 8/2002 | Koh ........................ 250/214 R |

FOREIGN PATENT DOCUMENTS

EP 0468535 1/1992

* cited by examiner

*Primary Examiner*—Ly V. Hua

(57) ABSTRACT

A method is presented for preventing the unauthorized use of a certain protected interface (102) in a processor (101. 101'). An indication (NO PAT, ALARM) of attempted use of the protected interface is generated, and as a response to said indication, at least a major part of the operation of the processor is disabled (DISABLE).

21 Claims, 3 Drawing Sheets

METHOD AND COUPLING ARRANGEMENT FOR PREVENTING UNAUTHORIZED ACCESS TO A MICROPROCESSOR

BACKGROUND OF THE INVENTION

1. Technical Field

The invention concerns generally the technology of protecting electronic circuits and their stored programs against unauthorized access. Especially the invention concerns the technology of preventing the unauthorized use of a certain interface to a processor.

2. Discussion of Related Art

A microprocessor (or "processor" for short) may comprise a so-called debug interface for providing extensive control over the operation of the processor. The debug interface can be used e.g. for uploading and downloading programs, reading the contents of the internal registers of the processor and performing step-by-step execution of stored programs. Generally it may be said that in a processor-controlled electronic device the debug interface offers a more or less direct access to all such functional features of the processor which may be proprietary to the manufacturer and/or authorized operator of the device. Manufacturers are therefore very eagerly looking for solutions which would prevent the unauthorized use of the debug interface. Depending on the structure of the processor there may also be other processor interfaces that should be similarly protected.

A brute force alternative for protecting an interface is to physically remove the external pins or sever the connections from them to the corresponding internal couplings in those devices which go from series production to the market. Thus the debug interface would be available only in prototypes and testing units. The disadvantage is clear: the debug interface is not available for example when a commercially available unit should be serviced or repaired.

SUMMARY OF INVENTION

It is an object of the present invention to provide a method and a coupling arrangement for preventing the unauthorized use of selected interfaces in a processor. It is also an object of the invention that the arrangement does not unnecessarily impede the authorized use of the protected interfaces. An additional object of the invention is to implement the protection without a large number of additional components.

The objects of the invention are achieved by associating the use of the debug interface with a change in a certain routine performed by the processor, arranging for the detection of such a change outside the processor and linking the detection with the disabling of a major part of the processor's operation if a certain enabling procedure has not been activated.

The method according to the invention is characterized in that it comprises the steps of a) generating an indication of attempted use of the protected interface and b) as a response to said indication, disabling at least a major part of the operation of the processor.

The invention also applies to a circuit arrangement which comprises a processor and within the processor a first interface. It is characterized in that for preventing the unauthorized use of the first interface it comprises means for generating an indication of attempted use of the first interface and means for responding to said indication by disabling at least a major part of the operation of the processor.

Additionally the invention applies to an electronic device which is characterized in that for preventing the unauthorized use of a certain first interface to a processor it comprises means for generating an indication of attempted use of the first interface and means for responding to said indication by disabling at least a major part of the operation of the processor.

A processor-controlled electronic device comprises also other components, among which there may be another circuit that is programmable in the sense that it can be arranged to wait for certain inputs and react to them with a certain response. According to the invention such an external circuit is arranged to act like a so-called watchdog: the processor the interface(s) of which should be protected has to regularly "pat the watchdog" or give a certain input to the external circuit in order to keep it from disabling at least a major part of the processor's operation. The processor is also arranged to associate the use of a protected interface with delaying or stalling the issuance of such inputs, so normally an attempt to use the protected interface will result in at least a major part of the processor's operation being disabled. An authorized user knows a secret command or procedure that will either keep the external circuit from reacting or override the reaction so that the processor remains operative.

The concept of "patting the watchdog" may also be understood in an inverse manner: under normal conditions the processor does not issue inputs to the external circuit, which keeps the processor enabled. An attempt to use the protected interface(s) causes the processor to issue an alarm to the external circuit which in turn disables at least a major part of the processor's operation. A release command or procedure is available for authorized users to keep the alarm from causing the disabling.

The novel features which are considered as characteristic of the invention are set forth in particular in the appended Claims. The invention itself, however, both as to its construction and its method of operation, together with additional objects and advantages thereof, will be best understood from the following description of specific embodiments when read in connection with the accompanying drawings.

DETAILED DESCRIPTION OF THE DRAWINGS

Figure 1A:
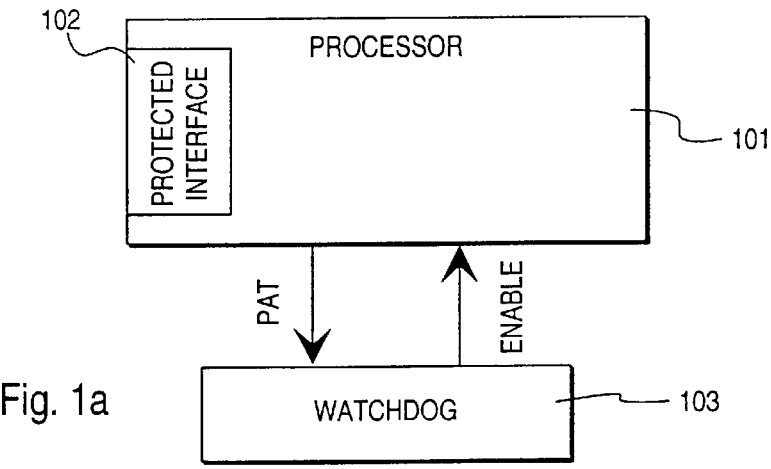
FIGS. 1a–1c illustrate the principle of a first embodiment of the invention.

Like parts in the drawings are designated with same reference designators.

Figure 1B:
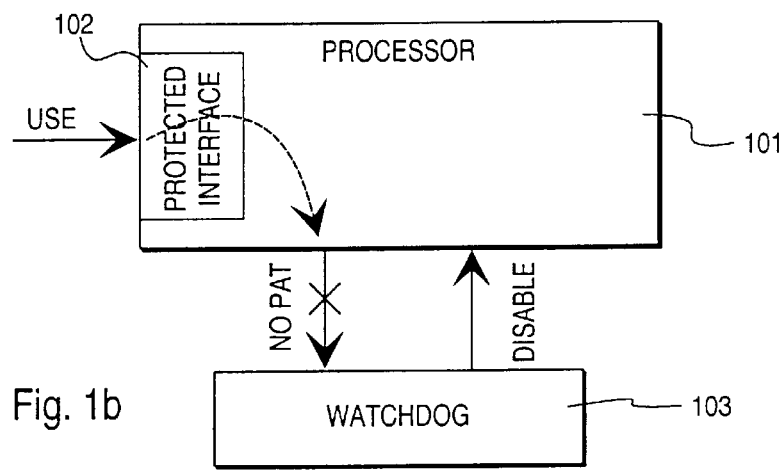
Figure 1C:
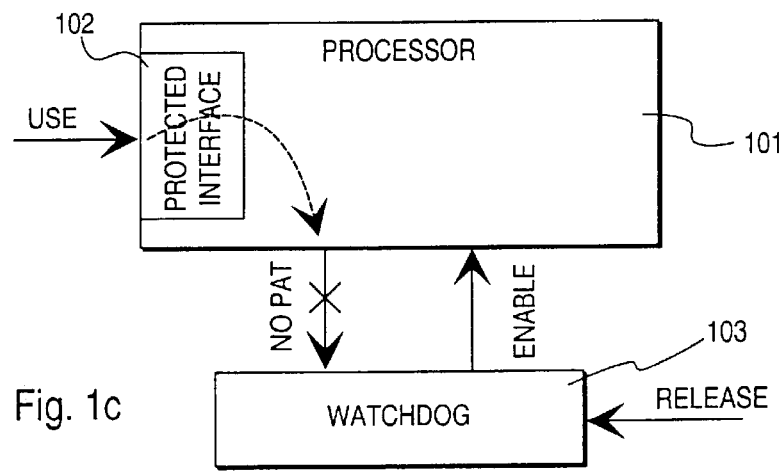

FIGS. 1a to 1c show a processor 101 with an interface 102 which should be protected against unauthorized access. Another part of the arrangement is a watchdog circuit 103. Under normal conditions, when there are no attempts to use the interface 102, the processor issues regularly a piece of input information to the watchdog circuit according to the "PAT" arrow. As a result the watchdog circuit 103 enables the operation of the processor 101 according to the "ENABLE" arrow. The processor 101 has been so constructed and programmed that when an attempt is made to use the protected interface 102 as in FIG. 1b, the processor stalls or delays the issuance of inputs to the watchdog circuit 103. The latter normally responds by disabling at least a major part of the processor's operation. FIG. 1c illustrates a situation where the attempt to use the protected interface 102 is accompanied with a release command to the watchdog circuit. The release command keeps the watchdog circuit 103 from disabling the processor 101 so that the user which knew the correct release command may proceed in using the protected interface e.g. for debugging a newly loaded software in the processor.

FIGS. 2a to 2c show again a processor and a watchdog circuit which now have been designated as 101' and 103' respectively because their operation differs slightly from that of the processor 101 and watchdog circuit 103 of FIGS. 1a to 1c. When no attempts are made to use the protected interface 102 of the processor 101' it does not give any inputs related to the protected interface to the watchdog circuit 103' as in FIG. 2a. An attempt to use the protected interface causes an alarm to be issued to the watchdog circuit 103' according to FIG. 2b, which disables at least a major part of the operation of the processor 101'. If the attempted use of the protected interface is accompanied with a certain release command as in FIG. 2c, the watchdog circuit 103' ignores the alarm and allows the enabled operation of the processor 101' to continue.

Figure 3:
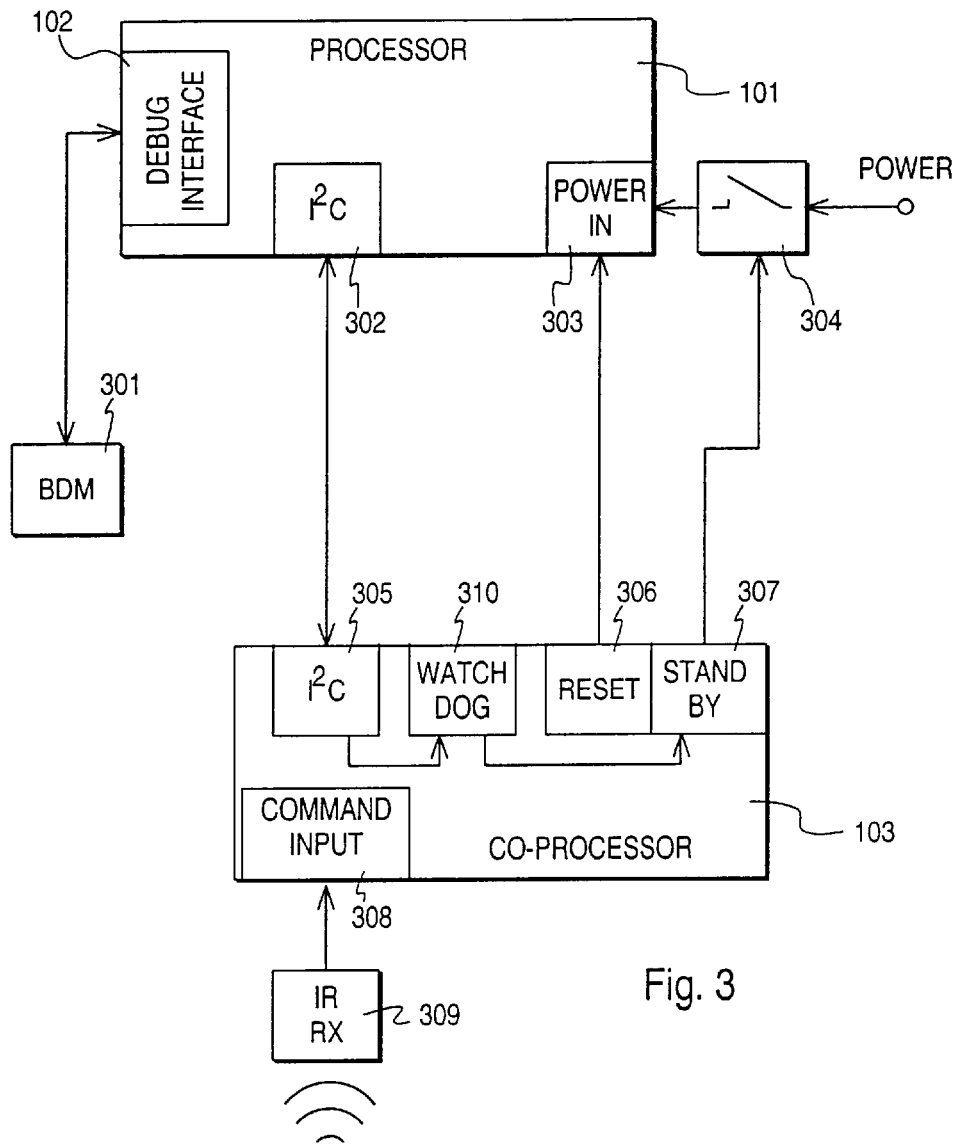
FIG. 3 illustrates a circuit arrangement implementing the principle of FIGS. 1a–1c and FIG. 4 illustrates an electronic device according to an embodiment of the invention.

FIG. 3 is an exemplary coupling arrangement which can be used to implement the principle of FIGS. 1a to 1c. The arrangement comprises a processor 101 with a debug interface 102 to be protected as well as a co-processor 103 that acts as a watchdog circuit. The debug interface is coupled to a Background Debugging Mode connector 301. The other displayed functional blocks of the processor 101 are the I$^2$C interface block 302 and the Power In block 303. The former is an interface block known as such: the I$^2$C interface is a two-wire de facto industrial standard bus for coupling programmable circuit elements locally together. The Power In block 303 is responsible for providing operational voltages for at least a major part of the processor 101. It is coupled to a power source through a switch 304 and has also various other, attributes among of which a reset input has been shown. Some of the specifically shown operational blocks of the co-processor 103 are the I$^2$C interface block 305, the reset signal output block 306, the standby signal output block 307 and the command input block 308. Of these the first one is for communicating with the main processor 101, the reset signal output block 306 is for issuing reset commands to the main processor 101, the standby signal output block 307 is for controlling the switch 304 and the command input block 308 is for receiving commands from external sources like an infrared receiver 309. There is also a watchdog block 310 the implementation and operation of which are described in more detail below.

While the reset signal from block 306 to block 303 remains activated the processor 101 is not operative. Once the reset signal is released, it is required that the processor 101 starts providing regularly a certain signal through the I$^2$C connection from block 302 to block 305. The requirement is fulfilled by ensuring that there is a corresponding set of instructions in the program which the processor executes. This implements the "watchdog patting" function. Another set of instructions in the program of the main processor is responsible for stalling the issuance of the "watchdog patting" signals as soon as an attempt is detected for using the debug interface 102.

There are multiple known ways for realizing a watchdog function as such in the co-processor 103. A simple implementation is based on a watchdog register within block 310. Each time the co-processor receives a "patting" signal through the I$^2$C interface, it resets the value of such a register to zero or other suitable fixed value. Between patting signals the co-processor regularly increments (or decrements) the value of the watchdog register. If the value reaches a certain limit, the co-processor takes it as an indication that the main processor is not responding any more. According to the principle of FIGS. 1a to 1c it transmits, through the standby signal output block 307, a signal that opens the switch 304. The main processor is thus blacked out completely. In a typical mode of operation the co-processor activates simultaneously the reset signal to block 303.

The recovery from the standby/reset condition occurs as determined in the program executed by the co-processor 103. A feasible mode of operation is such where the co-processor waits for a certain delay interval, then releases the standby signal causing the switch 304 to close and thereafter releases the reset signal. If the unauthorized user is still attempting to use the debug interface, the main processor does not even start issuing the "watchdog patting" signals so the watchdog register in the co-processor will soon reach its limit value again, causing another processor shutdown round. Only after the unauthorized attempts for using the debug interface 102 have been stopped, the processor 101 may resume normal operation.

An authorized debugging user of the system of FIG. 3 has an infrared transmitter which has been programmed to transmit a secret code word. If the co-processor 103 receives the code word through its command input block 308, it either stops incrementing (or decrementing) the value of the watchdog register in block 310 or disables the issuance of reset and standby signals from blocks 306 and 307 irrespective of the value of the watchdog register. These functions are again most advantageously realized through corresponding sets of instructions in the program executed by the co-processor. Through similar programming the co-processor may also be arranged to release an already-issued reset and/or standby signal as a response to a certain secret command or code word.

In order to keep the code word(s) secret and to prevent unauthorized access to the co-processor it is usually required that the co-processor does not have a debug interface of its own, and/or that the recognition of the code word(s) is based on the hardware of the co-processor rather than software.

Figure 2A:
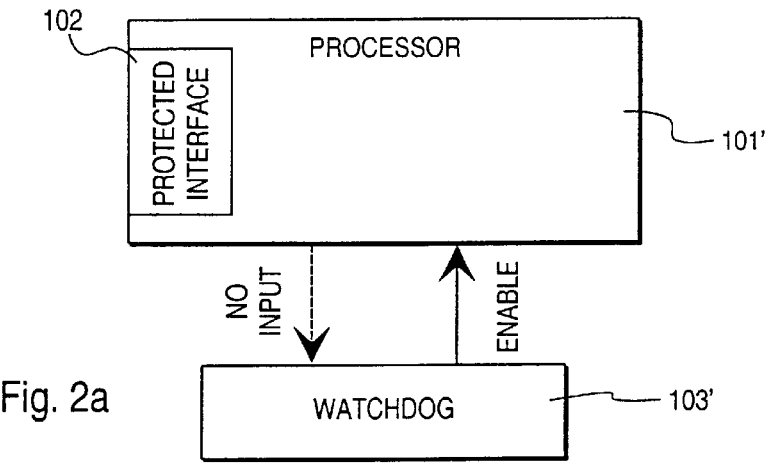
FIGS. 2a–2c illustrate the principle of a second embodiment of the invention.
Figure 2B:
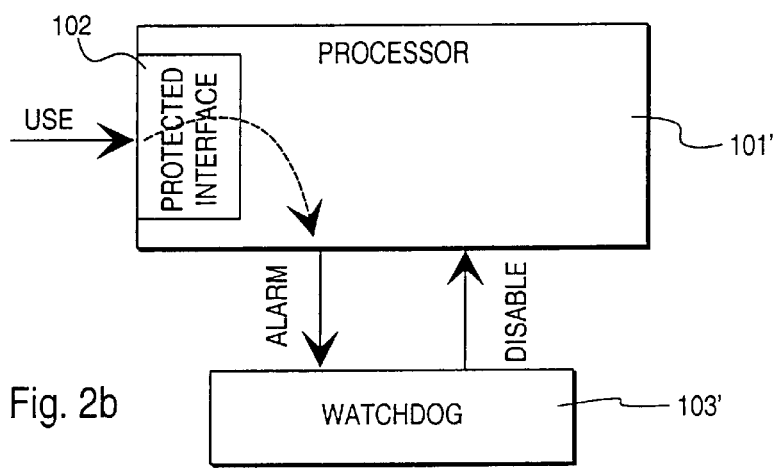
Figure 2C:
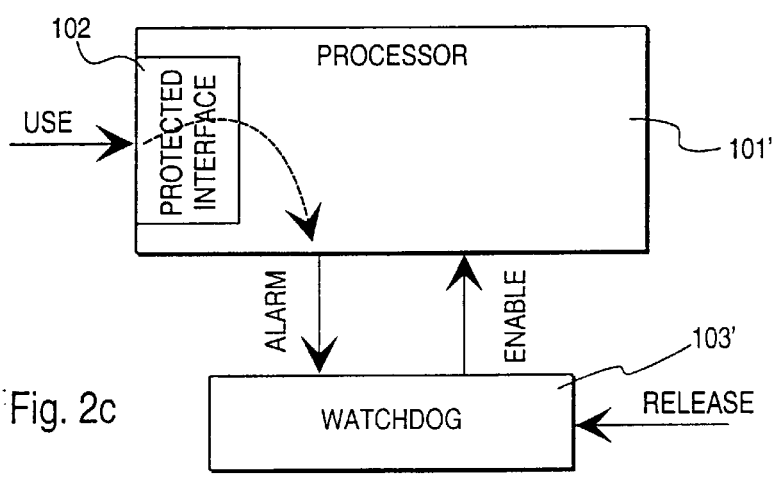

The coupling arrangement of FIG. 3 is easily generalized to implement the principle of FIGS. 2a to 2c: the I$^2$C interface is now used to carry the alarm signal, and the watchdog register 310 can be omitted. When an alarm signal is received in the co-processor, it sets the main processor into the standby mode by cutting the main power line with switch 304. Recovery takes place after the alarm signal is not active any more. However, the previously described principle is regarded as more advantageous because the standby condition is entered also if for some other reason the processor stops responding.

Figure 4:
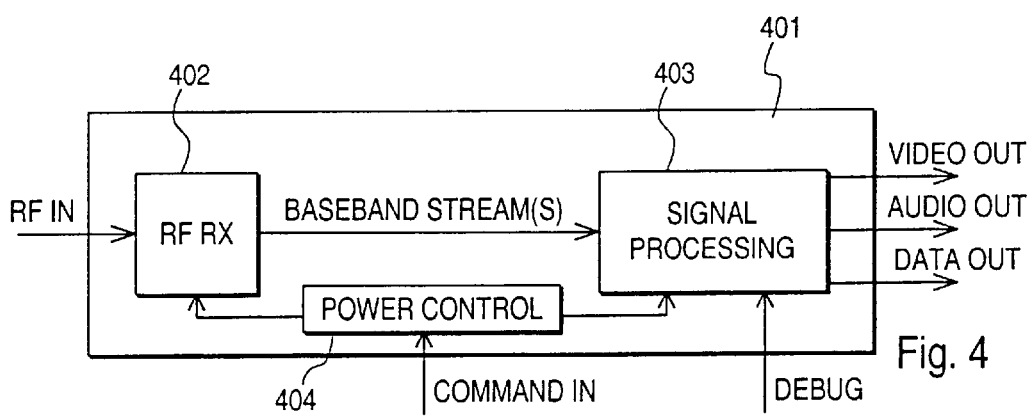

FIG. 4 illustrates an exemplary electronic device where the invention may be applied. The device is a multimedia terminal 401 where a radio frequency receiver 402 is arranged to receive a (number of) radio frequency signal(s) and convert it/them to a (number of) baseband stream(s). A signal processing block 403 is used to further convert the baseband stream(s) to video, audio and data output signals. There is a debug interface to the signal processing block for realizing the typical debugging functions. A power control block 404 is responsible for providing the voltages and reset signals to the other blocks. If the coupling arrangement of FIG. 3 is realized as a part of this exemplary device, the power control block 404 houses the co-processor and IR receiver blocks and the signal processing block consists mostly of the processor 101.

It should be noted that the invention does not require the main processor and the co-processor to be physically separate entities. They may be realized within a single chip or on parallel chips in a so-called multi-chip module. Indeed the continuing miniaturization of signal processing electronics certainly calls for continuously enhancing the integration ratios, so a very plausible application for the invention is to integrate the processor and watchdog functions to a single physical entity.

Also other modifications to the previously disclosed embodiments of the invention are possible without departing from the scope of the appended claims. For example, in a very simple embodiment of the invention the manufacturer of an electronic device may wish that the debug interface is not available for use at all in a completely assembled device, whereby the IR receiver or other command input for the authorized release commands may be left out from the described embodiments of the invention. We have also referred to a complete blackout of the processor as a response to the detected use of a protected interface; it is possible to disable only a part of the operations of the processor and to leave for example internal memory refreshing and other such functions operational that maintain the readiness for operation of the processor.

What is claimed is:

1. A method for preventing the unauthorized use of a certain protected interface (102) in a processor (101, 101'), characterized in that it comprises the steps of
    a) generating an indication (NO PAT, ALARM) of attempted use of the protected interface and
    b) as a response to said indication, disabling (DISABLE) at least a major part of the operation of the processor.

2. A method according to claim 1, characterized in that step a) comprises the sub-steps of
    a1) generating said indication within the processor (101, 101') and
    a2) transmitting the generated indication to an other component (103, 103'); and step b) comprises the sub-steps of
    b1) generating a disabling signal within said other component and
    b2) using said disabling signal for disabling at least a major part of the operation of the processor.

3. A method according to claim 2, characterized in that it comprises before step a1) a step of regularly transmitting a stream of signals (PAT) from the processor to said other component, and steps a1) and a2) correspond to delaying or stalling the generation and transmission of said stream of signals (NO PAT).

4. A method according to claim 2, characterized in that step b2 corresponds to switching the processor into a standby state.

5. A method according to claim 4, characterized in that said switching is accomplished by switching off the operating power of a major part of the processor.

6. A method according to claim 2, characterized in that steps a1) and a2) correspond to setting a specific alarm signal (ALARM) into an active state.

7. A method according to claim 1, characterized in that step b) is executed on condition that a certain release command (RELEASE) is not present.

8. A method according to claim 7, characterized in that step a) comprises the sub-steps of
    a1) generating said indication within the processor (101, 101') and
    a2) transmitting the generated indication to an other component (103, 103'); and step b) comprises the sub-steps of
    b0) detecting within said other component the potential presence of a releasing command (RELEASE), and if a releasing command is not present,
    b1) generating a disabling signal within said other component and
    b2) using said disabling signal (DISABLE) for disabling at least a major part of the operation of the processor.

9. A method according to claim 1, characterized in that step a) comprises the sub-steps of
    a1) generating said indication within the processor (101, 101') and
    a2) transmitting the generated indication to an other component (103, 103'); and step b) comprises the sub-steps of
    b1) generating a disabling signal within said other component,
    b2) using said disabling signal (DISABLE) for disabling at least a major part of the operation of the processor and
    b3) detecting within said other component the potential presence of a releasing command (RELEASE), and if a releasing command is present, re-enabling the disabled part of the operation of the processor.

10. The method of claim 1, wherein said indication of attempted use is generated within said processor.

11. A coupling arrangement comprising
    a processor (101, 101') and
    within the processor a first interface (102),
    characterized in that for preventing the unauthorized use of the first interface it comprises
        means for generating an indication (NO PAT, ALARM) of attempted use of
        the first interface and
        means (103, 103') for responding to said indication by disabling (DISABLE) at least a major part of the operation of the processor.

12. A coupling arrangement according to claim 11, characterized in that it comprises
    within the processor a second interface (302),
    an other component (103) coupled to said second interface,
    within the processor means for transmitting said indication to said other component through said second interface (302) and
    within said other component means (310, 307) for generating, on the basis of a received indication, a disabling signal for disabling at least a major part of the operation of the processor.

13. A coupling arrangement according to claim 12, characterized in that it comprises a switch (304), responsive to said disabling signal, for selectively switching off the operating power of a major part of the processor.

14. A coupling arrangement according to claim 12, characterized in that comprises
    within said other component a register (310) and means for regularly changing the value of said register monotonously into a certain direction, within the processor means (302) for regularly resetting said register to a certain constant value through said second interface, within said other component means for regularly comparing the value of said register against a certain limiting value which lies in said certain direction from said constant value, within said other component for generating, as a response to a detected equality or exceeding of the register value to the limiting value, said disabling signal (307).

15. A coupling arrangement according to claim 12, characterized in that it comprises within said other component means for detecting the potential presence of a release command (308) and means for disabling the issuance of said disabling signal as a response to the detected presence of a release command.

16. A coupling arrangement according to claim 12, characterized in that said means for detecting the potential presence of a release command are coupled to a wireless receiver (309) for receiving commands over a wireless link.

17. A coupling arrangement according to claim 12, characterized in that said other component (103) is a co-processor responsible for providing the voltages and reset signals to the other parts of the coupling arrangement.

18. The coupling arrangement of claim 11, wherein said indication of attempted use is generated within said processor.

19. An electronic device comprising a processor (101, 101') and a first interface (102) to access the operations of the processor, characterized in that for preventing the unauthorized use of the first interface it comprises means for generating an indication (NO PAT, ALARM) of attempted use of the first interface and means for responding to said indication by disabling (DISABLE) at least a major part of the operation of the processor.

20. An electronic device according to claim 19, characterized in that it comprises a command receiver (309) for receiving release commands, and means for inhibiting the disabling of the processor as a response to a received release command.

21. The electronic device of claim 19, wherein said indication of attempted use is generated within said processor.

* * * * *